United States Patent [19]

Phillips

[11] 4,280,445
[45] Jul. 28, 1981

[54] METHODS OF AND/OR APPARATUS FOR MILKING ANIMALS

[75] Inventor: Evan M. Phillips, Hamilton, New Zealand

[73] Assignee: AHI Operations Limited, Auckland, New Zealand

[21] Appl. No.: 45,315

[22] Filed: Jun. 4, 1979

[30] Foreign Application Priority Data

Jun. 2, 1978 [NZ] New Zealand .......................... 187464
Jan. 29, 1979 [NZ] New Zealand .......................... 189498

[51] Int. Cl.³ .............................. A01J 5/04; A01J 5/12
[52] U.S. Cl. ............................... 119/14.02; 119/14.36; 119/14.37; 119/14.55
[58] Field of Search ............... 119/14.55, 14.54, 14.37, 119/14.02, 14.36, 14.41, 14.29, 14.44

[56] References Cited

U.S. PATENT DOCUMENTS

| | | | |
|---|---|---|---|
| 2,702,526 | 2/1955 | Torgerson | 119/14.55 |
| 2,896,573 | 7/1959 | Schalm et al. | 119/14.55 X |
| 3,125,067 | 3/1964 | Fosnes | 119/14.55 |
| 3,150,637 | 9/1964 | Fosnes | 119/14.54 |
| 3,756,198 | 9/1973 | Rudle | 119/14.37 |

*Primary Examiner*—Hugh R. Chamblee
*Attorney, Agent, or Firm*—Holman & Stern

[57] ABSTRACT

Milking method and apparatus in which a diaphragm (8,29,39) interposed between a chamber (12,30,34) through which pulsation vacuum is applied to the outer cavity of a set of teat cups through a valve (11,6a, 7a, 33) and a further chamber (9) which is connected to the inner milking cavity of the teat cups so that the vacuum in the outer chamber is controlled by the valve (11,6a, 7a, 33) so as not to exceed and preferably to be equal to the vacuum in the milking cavity of the teat cup. The apparatus is provided in the milking machine claw and may be associated with one or two pulsators in that claw. Further valves (8,10a) prevent back flow from the claw to the teat cups.

17 Claims, 11 Drawing Figures

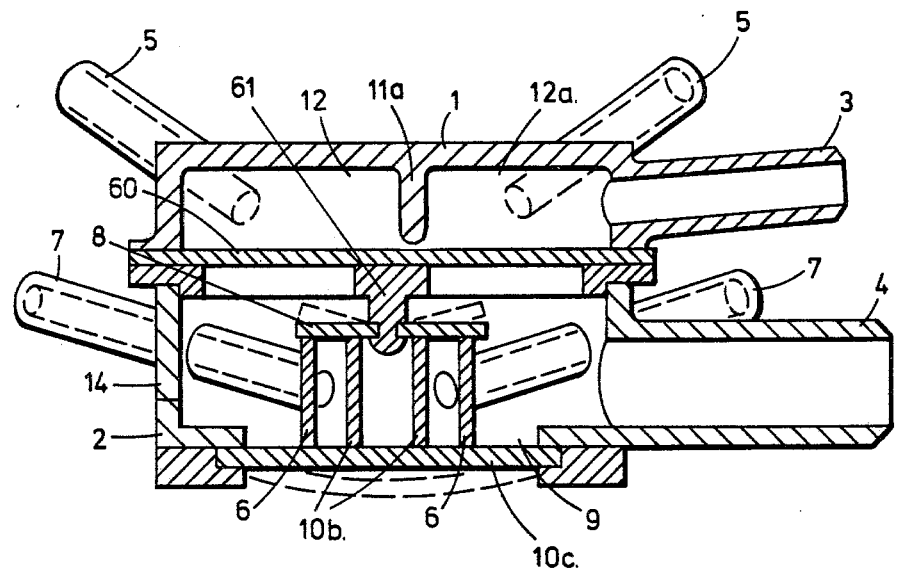
FIG.1.
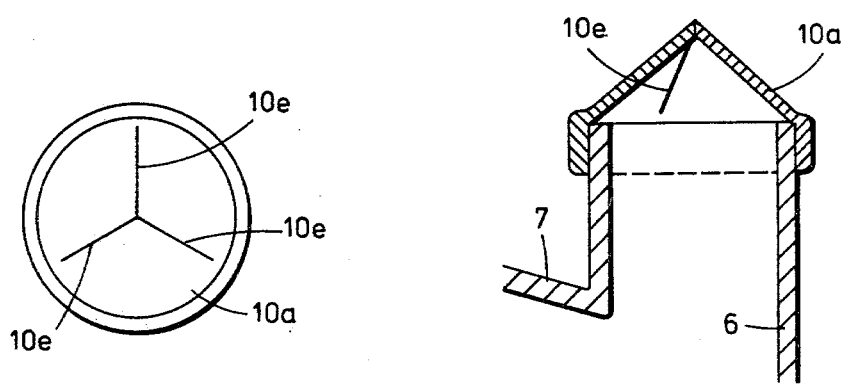
FIG.1a.
FIG.1b.

METHODS OF AND/OR APPARATUS FOR MILKING ANIMALS

BRIEF SUMMARY OF THE INVENTION

This invention relates to methods of and/or apparatus for milking animals.

In the conventional methods and apparatus for milking animals there are disadvantages in that the vacuum levels on both sides of the collaspible liner(inflation) in the teat cups are different in an undesirable manner. Thus when the cow is milking at a high rate, the vacuum inside the inflation will be quite low (say 30 kPa) because air is introduced into the milk line of the milking machine and work is carried out in transporting the milk from the animal by the pressure differences in that line. At the same time, the pressure applied to the outside of the inflation by the pulsation will vary between approximately atmospheric pressure (say 100 kPa) and normal plant vacuum (reduced pressure) level (say 50 kPa). This has two effects:

(a) It will cause a dilation of the inflation thus allowing air to pass the teat and create a higher vacuum in the mouth piece. This will increase teat cup crawling and affect milking adversely.

(b) The high vacuum on the outside of the liner will, because of the rapid outward movement of the liner during the start of the vacuum phase, momentarily increase the vacuum (decrease the pressure) inside the body of the teat. This will be particularly true at the end of milking when the teat sinus is closed at the top as a result of teat cup crawling.

The effect of this sudden reduction of internal teat pressure is to apply a pressure across the teat orifice, lower inside the teat than outside. If the potency of the teat orifice muscle is inadequate for complete closure this pressure difference can lead to the movement of milk from outside into the teat sinus. If this milk contains mastitis producing organisms, these will be drawn into the teat, resulting in infection of the gland.

The same situation can apply at the end of milking when milk flow has ceased. If the teat cup slips from one teat at the start of a vacuum stroke of the pulsation, the in-rush of air to the teat cups still on the other teats, will cause the pressure below the teats to exceed that inside the teats as a result of the outward movement of the liner. Thus conditions are created which can lead to the entry of milk through the teat orifice.

It is therefore an object of the present invention to provide means which will go at least some way to overcome the foregoing disadvantages or which will at least provide the public with a useful choice.

Accordingly in one aspect the invention consists in a method of milking animals which includes the step of controlling the pressure applied to each side of a teat cup liner when the teat cup is applied to a teat of the animal so that the maximum vacuum on the outside of the liner does not exceed the maximum vacuum obtaining inside the liner.

In a further aspect the present invention consists in apparatus for milking animals including a body containing a pressure controlled valve and including a pressure sensitive member sensitive to the pressure inside said teat cup liner interposed in use between a pulsator output connection and the pulsation chamber which lies between the body of a teat cup and the liner thereof and operable to control the pressure in said pulsation chamber, said pressure sensitive member controlling other parts of said pressure controlled valve so that in use when the teat cup is applied to the teat of an animal the maximum vacuum in said pulsation chamber does not exceed the vacuum in the interior of said liner.

In a still further aspect the invention consists in apparatus for milking animals including a body containing a milk chamber connectable to a milking machine milk line and to the interiors of the liners of a set of teat cups, a pulsator chamber connectable to a pulsator output connection and to the pulsation cavities between the bodies of said teat cups and the outsides of said liners, a pressure sensitive member between said chambers, a valve interposed between said pulsation output and said pulsation chambers said valve comprising a valve seat and a valve member actuable by said pressure sensitive member in use to control the pressure in said pulsation chamber so that the maximum vacuum (minimum pressure) in said pulsation chamber does not exceed the maximum vacuum in said milk chamber.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE SEVERAL VIEWS OF THE DRAWINGS

One preferred form of the invention and modifications thereof will now be described with reference to the accompanying drawings in which, FIG. 1 is a vertical cross section through a milking machine claw incorporating apparatus according to the invention, FIGS. 1A & 1B are sketches of an alternative valve forming part of the apparatus of FIG. 1.

DETAILED DESCRIPTION

Figure 2:
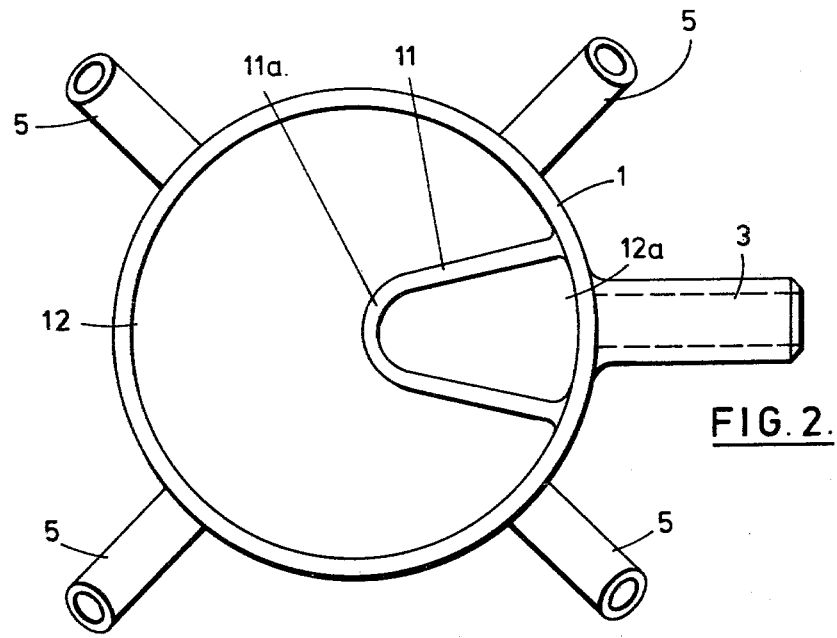
FIG. 2 is an inverted horizontal cross section through an upper part of the claw of FIG. 1.
Figure 3:
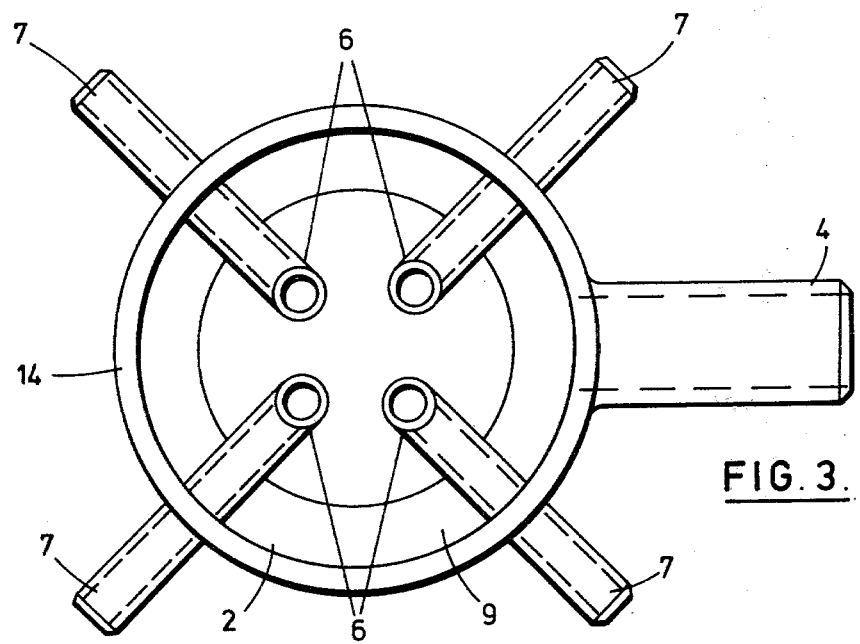
FIG. 3 is a horizontal cross section through a lower part of the claw of FIG. 1.

Referring to the drawings the claw illustrated in the sketches of FIGS. 1,2 and 3 has a cap 1 mounted on a base 2 with a connection 3 to the pulsation pipeline of a milking machine and nipples 5 which connect to the pulsation cavities of a set of teat cups (not shown) connected to the claw. Within the cap 1 is a vee shaped valve seat 11 (FIG. 2).

A milk chamber 9 of base 2 is connected via nozzle 4 to the milk line of the milking installation. Within cavity 9 are four vertical tubes 6 forming a T with the inlet ducts 7 which are in use connected to the milk cavities (not shown) of the teat cups i.e. the interiors of the resiliently flexible e.g. rubber liners or inflations mounted in the known way in the teat cup bodies. A simple non-return valve is fitted to the top end of the vertical tubes 6. The valve is a rubber disc or flap valve 8 supported from a vacuum balancing diaphragm supporting unit 61 to be described or a simple "heart" valve 10a having at least one pair of resiliently flexible membranes which contact each other along a line of contact to close the valve. Three lines of contact 10e are shown in FIG. 1B (FIGS. 1A & 1B) or any other suitable non return valve could be used. The bottom ends 10b of the vertical tubes 6 are substantially in a plane with the bottom of the milking chamber. A simple flexible disc 10c of rubber or other elastomer is fitted in the bottom of the milk chamber so that it normally rests against the bottom of the tubes 6. When milking vacuum is applied, this disc is firmly supported against the bottom of the tubes effectively sealing them off. The expression "vacuum" is used herein to indicate a reduced pressure of less than atmospheric pressure and the expression "maximum vacuum" is used to indicate a minimum pressure level (say 15" of mercury or 50 kPa) and minimum vacuum is used to indicate maximum pressure. Spring assistance to ensure closing off may also be provided. However, when positive pressure reverse flow washing is applied, this disc is deflected downwards, as shown in dash lines, by the washing pressure so allowing washing fluid to flow out through the teat cup connections and at the same time to wash the underside of the non return valves at the upper end of these vertical tubes.

A movable pressure sensitive member in the form of a diaphragm 60 is situated between cap 1 and base 2. Part of the diaphragm 60 acts as a valve member which coacts with a valve seat 11 to form a valve and the diaphragm 60 when free rests adjacent to the surface of the vee shaped valve seat 11 and a support member 61. The vee shaped valve seat is sloped in cross section so that the narrow (or centre) end 11a of said valve seat 11 is situated slightly (say 0.5 mm–1.0 mm) further from the upper surface of a plane containing diaphragm 60 than its wider end. This assists progressive operation of the diaphragm valve seat regulating action. Variations in pressure in milk chamber 9 will cause the position of diaphragm 60 to vary causing the diaphragm 60 to provide a larger or smaller opening between connection 3 to pulsation pipeline and the connections 5 leading to the spaces between the teat cup bodies and the exteriors of the inflations therein. The proportional shape and slope of the valve seat 11 are designed so that in use the maximum vacuum in the chamber 12 and thus the pulsation cavities of the teat cups does not exceed and is preferably equal to the instantaneous vacuum present in chamber 9.

The preferred form of vee shaped valve seat 11 is shown in FIG. 2. The steep vee shape allows the diaphragm to uncover the valve seat progressively from the centre region which is at the tip 11a of the vee shape seat. In this way, the control of air flow through the valve is a progressive action which prevents oscillatory movements of the diaphragm. If a circular valve seat is used, the diaphragm is forced to move abruptly from the entire valve seat with the result that the pressure outside the valve seat is violently disturbed. This change in pressure could cause the diaphragm 60 to be forced back onto the seat. This set of conditions could repeat in an oscillatory manner. This valve seat design is important to the smooth control action of the device.

Figure 9:
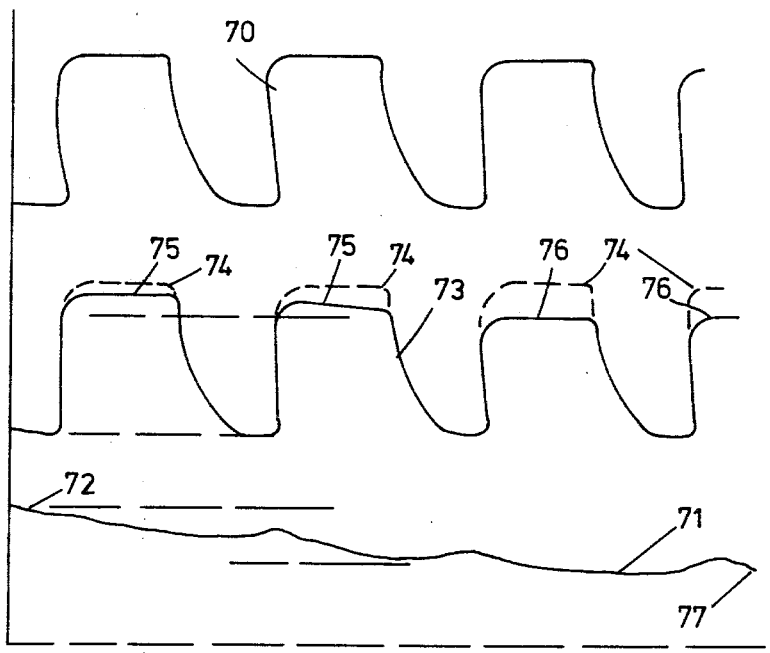

FIG. 9 illustrates the pressures in chambers 12a, 12 and 9 respectively. The line 70 shows a graph of the variation of vacuum in chamber 12a, i.e. it represents the normal pulsation variations. Line 71 shows a graph of the vacuum in chamber 9 the variation from the maximum vacuum at 72 being due to the effect of milk flow between the teat cup and the chamber 9 and the graph diagrammatically shows the effect of varying milk flows. Line 73 shows the pulsation vacuum in chamber 12 when the vacuum in chamber 9 varies as shown by line 71. Parts of the pulsation vacuum are shown by dash lines 74 and it will be seen that the maximum vacuum represented by the parts 75 and 76 are lower than the maximum shown by lines 74 and the lines 76 in the preferred form indicate vacuums of about 30 kPa i.e. about the same as the vacuum represented at 77 on line 71.

Thus it can be seen that the action of the apparatus is to allow the vacuum applied to the pulsation chambers of the teat cups via nipples 5 to be regulated so as to exceed and preferably to be at substantially the same level as the vacuum existing in cavity 9 of milk carrying section base 2, thus preferably substantially equalising the vacuum both inside and outside the teat cup liners.

The flap valves 8 or 10a on tubes 6 prevent run back of milk from chamber 9 (e.g. when the teat cups are removed) into the inlet ducts 7 and thence to the teat cups.

Air admission port 14 is provided in the end of chamber 9 opposite connection 4 to provide the air flow necessary to transport milk.

Many types of milking machines use the "alternative pulsation" system (or two plus two) in which two teat cups are operated in anti-phase to the other two.

The above described principles may be used for two plus two pulsation as follows.

Figure 6:
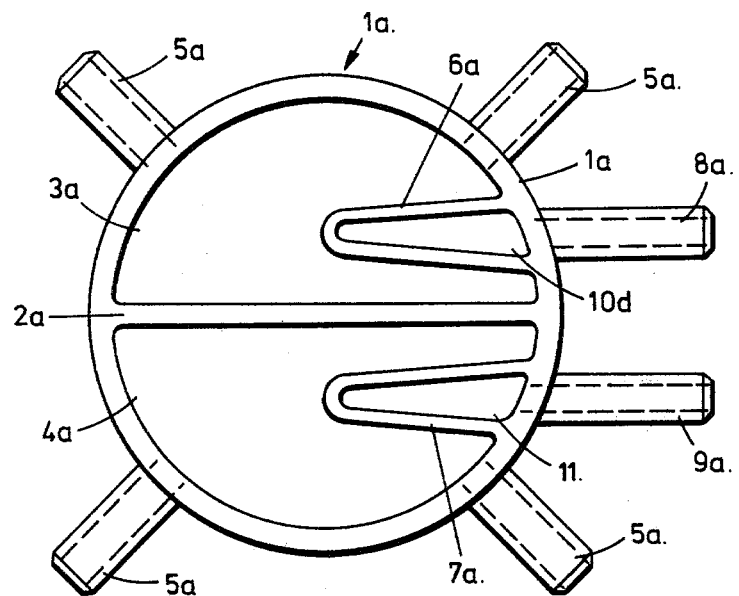
FIG. 6 is a cross section of an alternative form of claw base to suit a "two plus two" pulsator.

Cap 1 in FIG. 1 is replaced by cap 1a in FIG. 6. Cap 1a is similar to cap 1 except that it is provided with a diametral barrier 2a separating the main cavity into two sections 3a and 4a each of which is connected to two nipples 5a each of which leads to the cavity between a teat cup body and its inflation.

Cavities 3a and 4a are provided with vee shaped valve seats 6a and 7a and nipples 8a and 9a connect cavities 10d and 11a inside valve seats 6a and 7a to the outlet ports of a remote 2 plus 2 pulsator valve (not shown). Rib 61a or 61b in base 2b (FIG. 4) on support member 61 is located so as to coact with barrier 2a in cap 1a to clamp a diaphragm (not shown) the equivalent of diaphragm 60 across its diameter. Ribs 61a and 61b are designed so that they will not interrupt milk or air flow in or through cavity 9b. They may also support flap valve or disc valve 8 as in FIG. 1. Thus it will be seen that each half of a diaphragm the equivalent of diaphragm 60 acting with valve seats 6a and 7a will control the vacuum level in each of cavities 3a and 4a independently one from the other, so that when alternate phase pulsations are provided to the ports in nipples 8a and 9a the vacuum level of these pulsations will be substantially the same as that pertaining in central chamber 9b.

A further application of the invention is to provide a milking machine claw with its own pulsator. In this mode, shown in FIG. 5, cap 1 in FIG. 1 is replaced by a pulsator body 15 which fits over the top of diaphragm 60, the parts below diaphragm 60 being constructed as above described with reference to FIGS. 1 to 3. The other parts will be apparent from the following.

The pulsator described herewith is preferably that described in New Zealand Patent Specification 183701 (G.B. Pat. No. 11170/78).

Operations is as follows:

In place of the pulsator connection 3 in FIG. 1, a vacuum line is provided coupled to port 16, which connects to a wedge shaped valve seat 17 similar to valve seat 11 in FIG. 2.

Action of diaphragm 60 across valve seat 17 and under the influence of the milk line vacuum from base section 2 will regulate the vacuum in cavity 18 to be substantially the same as vacuum level pertaining at any instant in chamber 9 as above described.

To give the pulsator action when vacuum is applied to cavity 18 the diaphragm 29 and valve 19 fixed in diaphragm 29 are drawn downwards sealing diaphragm 29 against annular valve seat 20 and vacuum will then be connected through cavity 21 and ports 22 inside nipples 23 to the pulsator cavity of a teat cup. Normally four nipples 23 and ports 22 would be provided.

When valve 19 is drawn down from seat 28 admitting vacuum to cavity 21, air will be exhausted by the action of the low pressure in cavity 21 from cavity 25 in dome 26 via passageway 27 in the shaft of valve 19.

As soon as the air pressure in 25 falls to a sufficiently low level (i.e. vacuum level increases sufficiently) this low pressure acting over the whole upper surface of diaphragm 29 will overcome the downwards force due to the vacuum applied to cavity 21 so causing the centre of diaphragm 29 to move upwards, closing valve 19 against valve seat 28 and shutting off cavity 21 from the vacuum supply.

The outer portion of diaphragm 29 continues to move upwards away from seat 20 so that atmospheric air pressure which enters cavity 30 via port 31 will then pass into cavity 21 and via ports 22 and to the pulsator cavities of the teat cups to permit the normal milking squeeze to occur. At the same time since cavity 21 is now operating at a higher pressure air bleeds through passageway 27 in the spindle of valve 19 again raising air pressure in cavity 25 under dome 26 so that diaphragm 29 is again forced downwards onto seat 20.

At this point, valve 19 is able to be drawn downwards away from seat 28 by the vacuum in cavity 18, starting the cycle over again.

It will be seen that this is a self activating pulsator system with the differences that the vacuum level applied through parts 22 to the teat cups will be controlled by diaphragm 60 to be the same as that pertaining in cavity 9 at any given instant because of the regulating operation of diaphragm 60 against valve seat 17.

Figure 4:
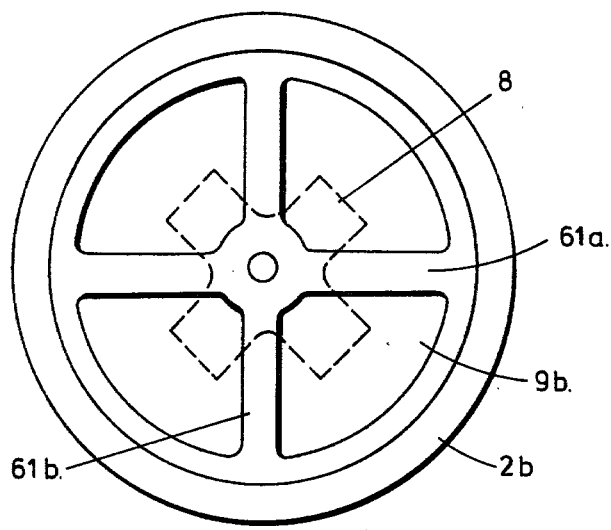
FIG. 4 is a plan view of a support member which prevents excessive downwards movement of the pressure control diaphragm and may also support a non-return valve.
Figure 5:
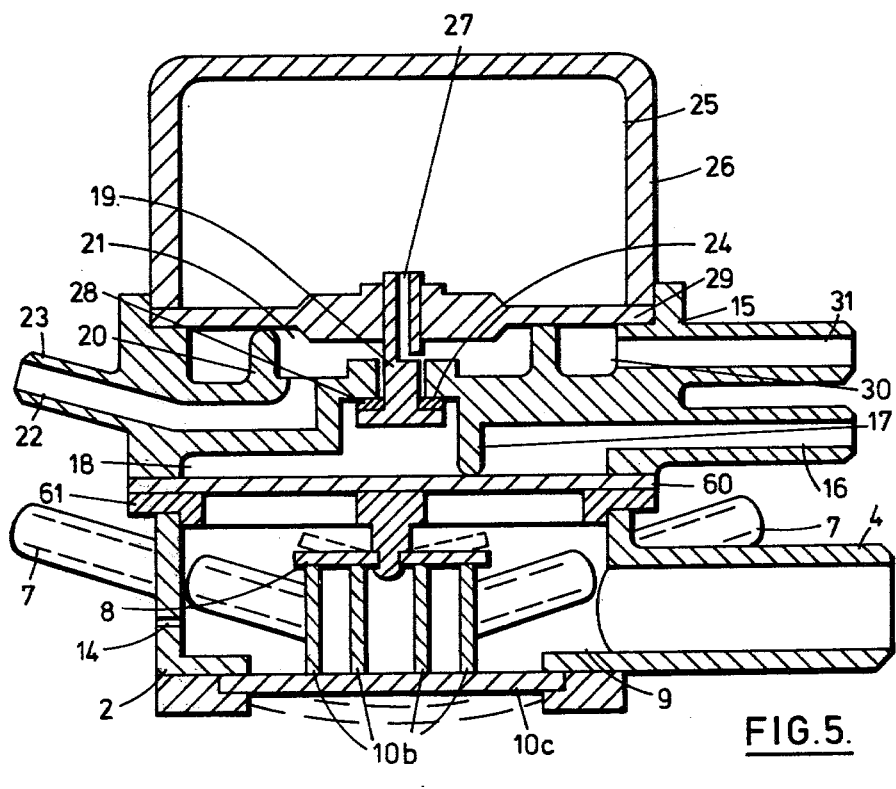
FIG. 5 is a vertical cross section of a combined pulsator and claw incorporating apparatus according to the invention.

It may also readily be seen that the advantages and/or capability of the 2 plus 2 construction described in FIGS. 4 & 6 and the pulsator claw of FIG. 5 may be readily combined.

Figure 7:
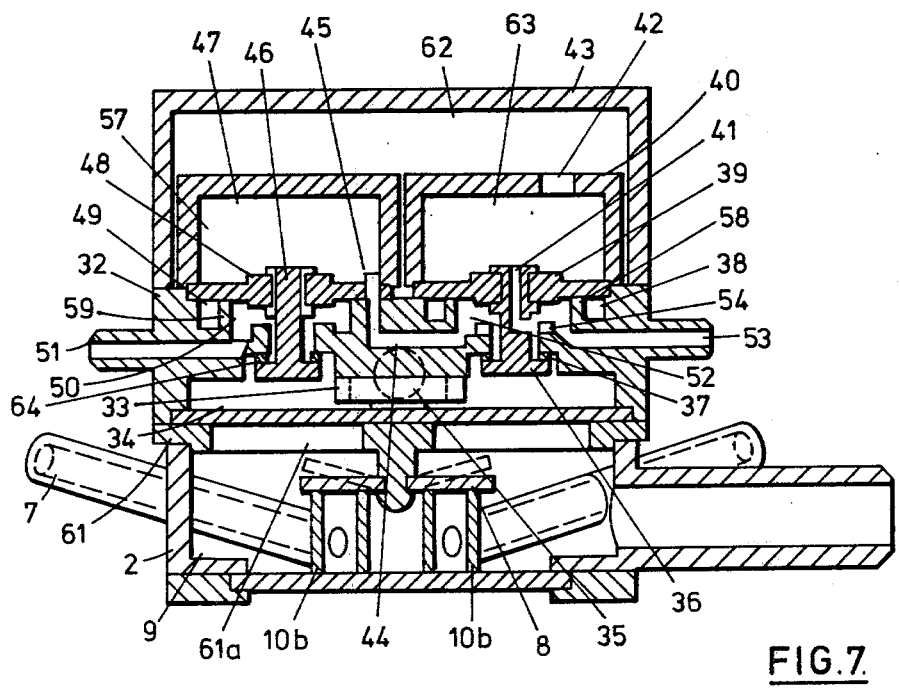
FIG. 7 is a further combination of a "two plus two" pulsator and claw according to the invention.
Figure 8:
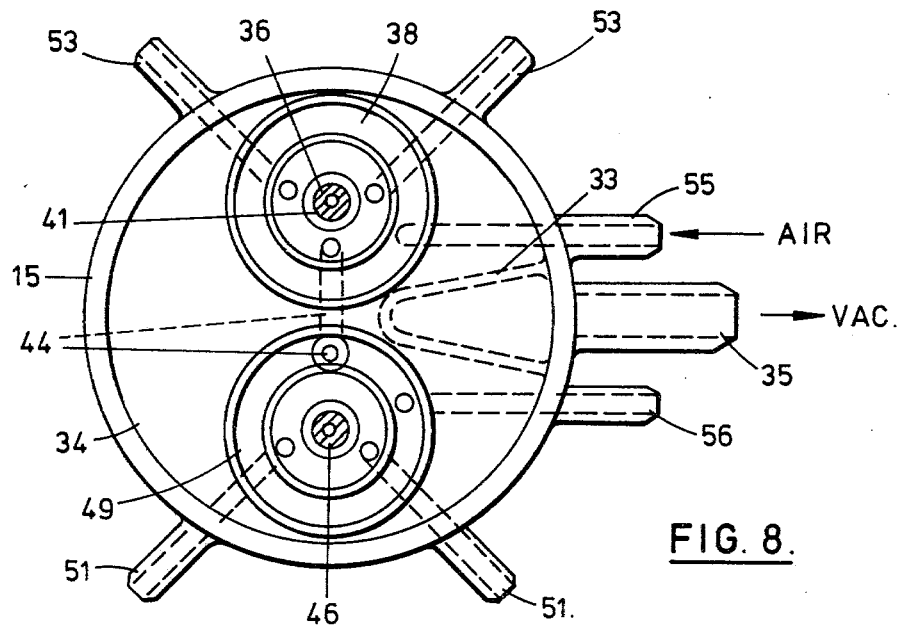
FIG. 8 is a horizontal cross section through the body 32 of a two plus two pulsator as shown in FIG. 7 and, FIG. 9 illustrates vacuum levels in chambers forming parts of the apparatus of FIG. 1.

Thus referring to FIG. 7, pulsator body 15 in FIG. 5 is replaced with body 32 in FIG. 7 on base 2 and diaphragm 60 and support 61 from FIG. 5.

Pulsator body 15 has in its lower surface, a vee shaped valve seat 33 in cavity 34 and port 35 which connects to the "vacuum" supply.

Two small pulsators, as described in New Zealand Patent Specification No. 183701 are situated side by side, each drawing "vacuum" from chamber 34.

One of these two pulsators has a drilled valve spindle and operates in an "automatic" mode, supplying alternate vacuum/air pulsations to two teat cups of a cluster as well as supplying a signal impulse to the second pulsator which is operating in a reversing "slave" or "relay" mode to operate the second pair of cups in the cluster.

A "reversing" pulsator, the second pulsator will supply an "air" pulse to the teat cups, when it receives a "vacuum" signal. Thus when the Master or Automatic pulsator supplies an "air" pulse to the teat cups operated by it, it also sends an "air" signal to the reverser which will immediately provide a "vacuum" pulse to the teat cups it controls.

So it will be seen that the two pulsators operating as a unit will provide a two plus two pulsation without needing external signal pulses and the vacuum level of those pulsations will be controlled to be at substantially the same level as the vacuum in the milk section of the claw by the action of diaphragm 60 as previously described.

The action is as follows:

Vacuum in cavity 34 will cause valve 36 to move downwards so that air will be evacuated from cavity 52. Diaphragm 39 will move down against stops 54, pushing valve 36 away from seat 37. Vacuum will then be coupled via cavity 52 and ports 53 to the teat cups, and via conduit 44 to cavity 57 under cover 47.

At the same time, air in cavity 62 in dome 43 will be evacuated through hole 42 in diaphragm retaining member 40 and conduit 41 in valve 36 by the vacuum in cavity 52.

Meantime, atmospheric pressure is connected through port 55 to chamber 38 and through port 56 to chamber 49.

As soon as the vacuum level in cavity 62 increases to a point where the pressure is lower than that in cavity 52 below diaphragm 39, the depressed centre portion of diaphragm 39 will return to its original position, closing valve 36 against seat 37 and shutting off the vacuum connection to cavity 63.

Continued movement of diaphragm 39 will result in the lower surface of 39 lifting away from annular seat 58 allowing air under atmospheric pressure to flow through port 55, cavity 38, cavity 52 and ports 53 to the teat cups as well as through conduit 44 to cavity 57 under cover 47.

Air will also now flow via conduit 41 in valve 36 to cavity 63. As the pressure in 63 approaches atmospheric pressure, diaphragm 39 will flex back into contact with annular seat 58, Valve 36 is again able to move downwards under the influence of the vacuum in 34 to start the cycle over again in a repetitive manner.

When valve 36 moves down to connect vacuum to cavity 52 and the teat cups via ports 53, vacuum is connected via conduit 44 to cavity 57 under cover 47. Reduction of pressure in 57 ensures that diaphragm 48 lifts upwards closing valve 46 against seat 64 and flexing away from annular seat 59.

This permits air under atmospheric pressure to flow via port 56, chamber 49 and ports 51 to the teat cups. This, it will be noted is while ports 53 and the other teat cups are under vacuum.

When valve 36 is closed as described above and "air" is connected to ports 53 and those teat cups, air flows via conduit 44 to cavity 57 under cover 47.

With atmospheric pressure in cavity 57 above diaphragm 48 and vacuum in cavity 34, the centre of diaphragm 48 will be deflected downwards opening valve 46 from seat 58 and connecting "vacuum" to ports 51 and the teat cups.

Thus it will be seen that the two pulsators will run in anti-phase to provide "2 plus 2" pulsation pressures with the vacuum level of those pulsations governed by the action of diaphragm 60 against vee shaped valve seat 33.

If it should be required to run this "2 plus 2" pulsator combination as "4 plus 0" to operate both pulsators in the same phase, it is only necessary to close off conduit 44 and form a hole in cover 47 (similar to hole 42 in cover 40). In this case both diaphragms 48 and 39 will be supplied with identical pressure conditions so will operate simultaneously in the same phase.

I claim:

1. A method of milking animals comprising the steps of applying a milking vacuum to the interior of each of at least one set of teat cups, applying a pulsating pressure to the pulsation cavity of each said teat cup, maintaining said milking vacuum and said pulsating pressure separate from each other and controlling said pulsating pressure so that the minimum pulsating pressure is no less than the milking vacuum by causing a pressure sensitive member to be exposed on one surface thereof to said pulsating pressure and on an opposite surface thereof to said milking vacuum and controlling the positional variations of the pressure sensitive member relative to a valve seat engaging the pulsating pressure surface of the pressure sensitive member to control the minimum pulsating pressure to be not less than the pressure of said milking vacuum.

2. A method as claimed in claim 1 which includes the step of controlling the minimum pulsating pressure to be substantially equal to said milking vacuum.

3. A method as claimed in claim 1 which includes the step of using one surface of a diaphragm which forms said pressure sensitive member as said valve member to engage a greater or lesser proportion of said valve seat to provide said control.

4. A method as claimed in claim 1 which includes the step of automatically preventing back flow of milk from a milk receiving chamber to the interiors of a set of teat cups.

5. In an apparatus for milking animals including at least one set of teat cups to which in use a milking vacuum is applied to the interior milking cavities of each said teat cup and a pulsating pressure is applied to the pulsation cavity of each said teat cup; a hollow housing member, a pressure sensitive member supported within the said housing member and dividing the hollow interior thereof into at least one milking chamber and at least one separate pulsation chamber, means connecting said milking chamber to the milking cavities of said teat cups, means connecting said pulsation chamber to the pulsation cavities of said teat cups, means connecting said milking chamber to a milking vacuum line of the milking apparatus, means to connect said pulsation chamber to a source of pulsating pressure, said pressure sensitive member being exposed in use on one surface thereof to said milking vacuum and on the opposite surface to said pulsating pressure, said pulsating pressure being maintained separate from said milking vacuum; a valve member integral with said pressure sensitive member and a valve seat supported within said pulsation chamber in engagement with said valve member so that said pressure sensitive member controls said valve member in relation to said valve seat in use to provide that the minimum pulsating pressure is not less than the pressure of said milking vacuum.

6. Apparatus as claimed in claim 5 wherein said pressure sensitive member comprises a diaphragm.

7. Apparatus as claimed in claim 6 wherein said valve member is comprised of part of said diaphragm.

8. Apparatus as claimed in claim 7 wherein said valve seat comprises a V-shaped member positioned and arranged so that said part of said diaphragm makes progressive contact or release or contact with said valve seat to reduce or increase the size of the valve opening as said diaphragm responds to change in vacuum in said milking chamber.

9. Apparatus as claimed in any one of claims 8, 5, 6 or 7 when incorporated in a milking machine claw.

10. Apparatus as claimed in any one of claims 8, 5, 6 or 7 wherein in use said pressure sensitive member controls said valve so that the minimum pressure in said pulsation chamber is substantially equal to the instantaneous vacuum in the interior of each said teat cup.

11. Apparatus as claimed in any one of claims 8, 6 or 7 wherein back flow prevention means are provided to prevent back flow of milk from said apparatus into said teat cup interiors.

12. Apparatus as claimed in claim 11 wherein said back flow prevention means comprise further valves in the line between said milking vacuum and said teat cup interiors selected from "heart" valves having at least three resilient flexible membranes which contact each other to close the valve and flap valves.

13. Apparatus as claimed in claim 12 in combination with two pulsators.

14. Apparatus as claimed in claim 12 in combination with a pulsator.

15. Apparatus as claimed in claim 14 wherein said pulsator comprises an integral body defining a plurality of valve ports, said diaphragm being edge mounted in said body and being operable by pressure differential from one side of said diaphragm to the other to open and close selected ones of said valve ports in a desired manner by deflection of said diaphragm.

16. Apparatus as claimed in claim 15 wherein said valve ports include at least two valve ports coaxially mounted with regard to the centre of said diaphragm.

17. Apparatus as claimed in claim 16 wherein at least one of said valve ports comprises an annular valve port mounted adjacent the rim of said diaphragm, part of said diaphragm engaging the mouth of said annular valve port to give a valving action.

* * * * *